US007920968B2

(12) United States Patent
Chapin et al.

(10) Patent No.: US 7,920,968 B2
(45) Date of Patent: Apr. 5, 2011

(54) GENERATING HUMAN-CENTRIC DIRECTIONS IN MAPPING SYSTEMS

(75) Inventors: Charles Chapin, San Jose, CA (US);
Michele Covell, Palo Alto, CA (US);
Tiruvilwamalai Venkatraman Raman, San Jose, CA (US); Andrew R. Golding, Mountain View, CA (US); Jens Eilstrup Rasmussen, San Francisco, CA (US)

(73) Assignee: Google Inc., Mountain View, CA (US)

( * ) Notice: Subject to any disclaimer, the term of this patent is extended or adjusted under 35 U.S.C. 154(b) by 926 days.

(21) Appl. No.: 11/466,326

(22) Filed: Aug. 22, 2006

(65) Prior Publication Data

US 2007/0016368 A1    Jan. 18, 2007

Related U.S. Application Data

(63) Continuation-in-part of application No. 11/181,386, filed on Jul. 13, 2005, now Pat. No. 7,831,387.

(51) Int. Cl.
*G01C 21/30* (2006.01)
*G01C 21/32* (2006.01)
(52) U.S. Cl. ........ 701/211; 701/200; 701/201; 701/202; 701/206; 701/208; 701/209; 701/210; 701/212; 701/213; 340/988; 340/990; 340/995.1; 340/995.19; 340/995.24; 342/352; 342/357.06; 342/357.13
(58) Field of Classification Search .............. 701/200, 701/201, 202, 208, 209, 210, 211, 212, 213; 340/988, 990, 995, 955.19; 342/357.06, 342/357.07, 357.09, 357.13, 357.1
See application file for complete search history.

(56) References Cited

U.S. PATENT DOCUMENTS

| | | | |
|---|---|---|---|
| 4,972,319 A | 11/1990 | Delorme | |
| 5,051,928 A | 9/1991 | Gruters | |
| 5,559,707 A * | 9/1996 | DeLorme et al. | 701/200 |
| 5,613,051 A | 3/1997 | Iodice et al. | |
| 5,625,668 A | 4/1997 | Loomis et al. | |
| 5,646,751 A | 7/1997 | Motamed et al. | |
| 5,737,533 A | 4/1998 | de Hond | |
| 5,760,783 A | 6/1998 | Migdal et al. | |
| 5,802,492 A | 9/1998 | DeLorme et al. | |
| 5,842,009 A | 11/1998 | Borovoy et al. | |

(Continued)

FOREIGN PATENT DOCUMENTS

CA    2169421    11/1996

(Continued)

OTHER PUBLICATIONS

Canadian Office Action, Canadian Patent Application No. 2,560,560, Feb. 5, 2008, 3 pages.

(Continued)

*Primary Examiner* — Khoi Tran
*Assistant Examiner* — Jaime Figueroa
(74) *Attorney, Agent, or Firm* — Fenwick & West LLP (57) ABSTRACT

Digital mapping techniques are disclosed that provide visually-oriented information to the user, such as driving directions that include visual data points along the way of the driving route, thereby improving the user experience. The user may preview the route associated with the driving directions, where the preview is based on, for example, at least one of satellite images, storefront images, and heuristics and/or business listings. The visually-oriented information can be presented to the user in a textual, graphical, or verbal format, or some combination thereof.

25 Claims, 4 Drawing Sheets

U.S. PATENT DOCUMENTS

| | | | | |
|---|---|---|---|---|
| 5,848,373 | A | 12/1998 | DeLorme et al. | |
| 5,910,805 | A | 6/1999 | Hickey et al. | |
| 5,938,709 | A | 8/1999 | Hale et al. | |
| 6,002,809 | A | 12/1999 | Feig et al. | |
| 6,031,963 | A | 2/2000 | Kitamura et al. | |
| 6,054,990 | A | 4/2000 | Tran | |
| 6,098,015 | A | * 8/2000 | Nimura et al. | 701/209 |
| 6,100,897 | A | 8/2000 | Mayer et al. | |
| 6,111,583 | A | 8/2000 | Yaron et al. | |
| 6,144,338 | A | 11/2000 | Davies | |
| 6,167,382 | A | 12/2000 | Sparks et al. | |
| 6,182,010 | B1 | 1/2001 | Berstis | |
| 6,199,014 | B1 | 3/2001 | Walker et al. | |
| 6,202,026 | B1 | 3/2001 | Nimura | |
| 6,208,934 | B1 * | 3/2001 | Bechtolsheim et al. | 701/209 |
| 6,247,019 | B1 | 6/2001 | Davies | |
| 6,252,608 | B1 | 6/2001 | Snyder et al. | |
| 6,262,741 | B1 | 7/2001 | Davies | |
| 6,266,614 | B1 * | 7/2001 | Alumbaugh | 701/211 |
| 6,278,938 | B1 * | 8/2001 | Alumbaugh | 701/208 |
| 6,307,573 | B1 | 10/2001 | Barros | |
| 6,321,158 | B1 * | 11/2001 | DeLorme et al. | 701/201 |
| 6,346,938 | B1 | 2/2002 | Chan et al. | |
| 6,388,684 | B1 | 5/2002 | Iwamura | |
| 6,421,053 | B1 | 7/2002 | Johns et al. | |
| 6,430,553 | B1 | 8/2002 | Ferret | |
| 6,473,691 | B1 | 10/2002 | Winter et al. | |
| 6,496,189 | B1 | 12/2002 | Yaron et al. | |
| 6,523,061 | B1 | 2/2003 | Halverson et al. | |
| 6,532,418 | B2 | 3/2003 | Chun et al. | |
| 6,538,656 | B1 | 3/2003 | Cheung et al. | |
| 6,573,905 | B1 | 6/2003 | MacInnis et al. | |
| 6,584,401 | B2 | 6/2003 | Kirshenbaum et al. | |
| 6,622,084 | B2 | 9/2003 | Cardno et al. | |
| 6,718,258 | B1 | 4/2004 | Barton | |
| 6,724,382 | B2 | 4/2004 | Kenyon et al. | |
| 6,741,926 | B1 | 5/2004 | Zhao et al. | |
| 6,766,320 | B1 | 7/2004 | Wang et al. | |
| 6,826,472 | B1 * | 11/2004 | Kamei et al. | 701/202 |
| 6,853,905 | B2 | 2/2005 | Barton | |
| 6,944,533 | B2 | 9/2005 | Kozak et al. | |
| 7,050,068 | B1 | 5/2006 | Bastos et al. | |
| 7,054,741 | B2 | 5/2006 | Harrison et al. | |
| 7,054,745 | B1 | 5/2006 | Couckuyt et al. | |
| 7,081,902 | B1 | 7/2006 | Crow et al. | |
| 7,136,915 | B2 | 11/2006 | Rieger, III | |
| 7,210,119 | B2 | 4/2007 | Pothos et al. | |
| 7,222,306 | B2 | 5/2007 | Kaasila et al. | |
| 7,260,474 | B1 * | 8/2007 | Thayathil et al. | 701/202 |
| 7,353,034 | B2 | 4/2008 | Haney | |
| 7,373,244 | B2 | 5/2008 | Kreft | |
| 7,451,041 | B2 | 11/2008 | Laumeyer et al. | |
| 7,542,882 | B2 | 6/2009 | Agrawala et al. | |
| 7,565,240 | B2 | 7/2009 | Tomizawa | |
| 7,580,045 | B2 | 8/2009 | Harrison et al. | |
| 7,610,219 | B2 | 10/2009 | Sayed | |
| 7,617,296 | B2 | 11/2009 | Bank | |
| 2001/0034661 | A1 | 10/2001 | Ferreira | |
| 2001/0044837 | A1 | 11/2001 | Talib et al. | |
| 2002/0002478 | A1 | 1/2002 | Swart et al. | |
| 2002/0067353 | A1 | 6/2002 | Kenyon et al. | |
| 2002/0067374 | A1 | 6/2002 | Kenyon | |
| 2002/0067379 | A1 | 6/2002 | Kenyon et al. | |
| 2002/0095328 | A1 | 7/2002 | Swart et al. | |
| 2002/0099613 | A1 | 7/2002 | Swart et al. | |
| 2002/0159657 | A1 * | 10/2002 | DeLorme | 383/39 |
| 2002/0163654 | A1 | 11/2002 | Levantovsky | |
| 2003/0038845 | A1 | 2/2003 | Okamura | |
| 2003/0041087 | A1 | 2/2003 | Pothos et al. | |
| 2003/0050065 | A1 | 3/2003 | Alletson et al. | |
| 2003/0061211 | A1 | 3/2003 | Shultz et al. | |
| 2003/0078897 | A1 | 4/2003 | Florance et al. | |
| 2003/0095135 | A1 | 5/2003 | Kaasila et al. | |
| 2003/0182052 | A1 | 9/2003 | DeLorme et al. | |
| 2003/0220734 | A1 | 11/2003 | Harrison et al. | |
| 2004/0039520 | A1 | 2/2004 | Khavakh et al. | |
| 2004/0075660 | A1 | 4/2004 | Liao et al. | |
| 2004/0100460 | A1 | 5/2004 | Yamada et al. | |
| 2004/0128215 | A1 | 7/2004 | Florance et al. | |
| 2004/0145599 | A1 | 7/2004 | Taoka et al. | |
| 2004/0153434 | A1 | 8/2004 | Cogen et al. | |
| 2005/0065856 | A1 | 3/2005 | Roberts et al. | |
| 2005/0122294 | A1 | 6/2005 | Ben-David et al. | |
| 2005/0131634 | A1 * | 6/2005 | Ignatin | 701/202 |
| 2005/0171686 | A1 * | 8/2005 | Davis | 701/200 |
| 2005/0216287 | A1 | 9/2005 | Crosby et al. | |
| 2005/0216448 | A1 | 9/2005 | Talib et al. | |
| 2005/0246487 | A1 | 11/2005 | Ergan et al. | |
| 2005/0246627 | A1 | 11/2005 | Sayed | |
| 2005/0270299 | A1 | 12/2005 | Rasmussen et al. | |
| 2005/0270311 | A1 | 12/2005 | Rasmussen et al. | |
| 2005/0286493 | A1 | 12/2005 | Angelhag | |
| 2006/0017562 | A1 | 1/2006 | Bachelder | |
| 2006/0041375 | A1 | 2/2006 | Witmer et al. | |
| 2006/0075442 | A1 | 4/2006 | Meadow | |
| 2006/0089792 | A1 | 4/2006 | Manber et al. | |
| 2006/0123053 | A1 | 6/2006 | Scannell | |
| 2006/0173841 | A1 * | 8/2006 | Bill | 707/6 |
| 2006/0200383 | A1 | 9/2006 | Arutunian et al. | |
| 2006/0206363 | A1 | 9/2006 | Gove | |
| 2006/0241859 | A1 | 10/2006 | Kimchi et al. | |
| 2006/0271286 | A1 | 11/2006 | Rosenberg | |
| 2007/0010942 | A1 * | 1/2007 | Bill | 701/209 |
| 2007/0011145 | A1 | 1/2007 | Snyder | |
| 2007/0022007 | A1 | 1/2007 | Lawe | |
| 2007/0050340 | A1 | 3/2007 | Von Kaenel et al. | |
| 2007/0073583 | A1 | 3/2007 | Grouf et al. | |
| 2007/0073584 | A1 | 3/2007 | Grouf et al. | |
| 2007/0100801 | A1 | 5/2007 | Celik et al. | |
| 2007/0100802 | A1 | 5/2007 | Celik | |
| 2007/0100867 | A1 | 5/2007 | Celik et al. | |
| 2007/0106468 | A1 * | 5/2007 | Eichenbaum et al. | 701/211 |
| 2007/0154067 | A1 | 7/2007 | Laumeyer et al. | |
| 2007/0156524 | A1 | 7/2007 | Grouf et al. | |
| 2007/0156525 | A1 | 7/2007 | Grouf et al. | |
| 2007/0179867 | A1 | 8/2007 | Glazer et al. | |
| 2007/0192189 | A1 | 8/2007 | Popowich et al. | |
| 2007/0198182 | A1 | 8/2007 | Singh | |
| 2007/0203643 | A1 * | 8/2007 | Ramaswamy et al. | 701/211 |
| 2007/0239348 | A1 * | 10/2007 | Cheung | 701/200 |
| 2007/0244753 | A1 | 10/2007 | Grouf et al. | |
| 2007/0265858 | A1 | 11/2007 | Pansari et al. | |
| 2008/0027642 | A1 | 1/2008 | Winberry et al. | |
| 2008/0040212 | A1 | 2/2008 | Grouf et al. | |
| 2008/0052150 | A1 | 2/2008 | Grouf et al. | |
| 2008/0052151 | A1 | 2/2008 | Xie et al. | |
| 2010/0185514 | A1 | 7/2010 | Glazer et al. | |

FOREIGN PATENT DOCUMENTS

| | | |
|---|---|---|
| EP | 0967556 A2 | 12/1999 |
| EP | 1193626 | 4/2002 |
| WO | WO 00/39755 | 7/2000 |

OTHER PUBLICATIONS

Canadian Office Action, Canadian Patent Application No. 2,560,386, Oct. 29, 2007, 3 pages.

Indian Office Action, Indian Patent Application No. 1237/MUMNP/2006, Nov. 13, 2007, 2 pages.

Indian Office Action, Indian Patent Application No. 1247/MUMNP/2006, Nov. 8, 2007, 2 pages.

PCT International Search Report and Written Opinion, PCT/US06/26745, Nov. 21, 2007, 7 pages.

PCT International Search Report and Written Opinion, PCT/US05/09538, Sep. 20, 2007, 7 pages.

Cosman, M., "Global Terrain Texture: Lowering the Cost," Proceedings of the 1994 Image VII Conference, Tempe, Arizona: The Image Society, pp. 53-64.

Crawford, C., et al., Fast 3D Visualization of Large Image Datasets in a GIS, Earth Observation Magazine, vol. 12, No. 9, Dec. 2003, USA, pp. 1-5.

Dragan, R. V., MSN Virtual Earth 1.0, MSN Virtual Earth 1.0 review by PC Magazine, Jul. 26, 2005, [online], [retrieved on Aug. 1, 2005]. Retrieved from the Internet <URL: http://www.pcmag.com/article2/0,1895,1840750,00.asp>, pp. 1-2.

ESRI Video Clips—Demos—What is GIS?, ESRI GIS and Mapping Software, Mar. 31, 2006, [online] [Retrieved on Mar. 31, 2006] Retrieved from the InternetURL:http://gis2.esri.com/esriclips/clip.cfm?ClipID=60.

Gleicher, M. et al., "Through-the-Lens Camera Control," Proceedings SIGGRAPH '92, Computer Graphics, Jul. 1992, pp. 331-340, vol. 26, No. 2.

Ho, T. K., et al., "Word Recognition with Multi-Level Contextual Knowledge," Center for Document Analysis and Recognition, State University of New York at Buffalo, pp. 1-11, Buffalo, New York.

Leclerc et al., "TerraVision: A Terrain Visualization System," SRI International, Menlo Park, California, Tech. Note No. 540, Apr. 22, 1994.

MapQuest.Com Maps, Directions and More, [online], [retrieved on Aug. 1, 2005]. Retrieved from the Internet <URL: http://www.mapquest.com>.

Montalbano, E., Microsoft Takes on Google with Virtual Earth, IDG News Service, Jul. 25, 2005, [online], [retrieved on Aug. 1, 2005]. Retrieved from the Internet <URL: http://www.infoworld.com/article/05/07/25/HNmsvirtualearth_1.html>.

MSN Maps & Directions, [online], [retrieved on Aug. 1, 2005]. Retrieved from the Internet <URL: http://maps.msn.com/(ogxuearj4ya5au55fogcdzbt)/Home.aspx.

MSN Virtual Earth—Microsoft Internet Explorer, [online], [retrieved on Aug. 1, 2005]. Retrieved from the Internet URL:http://virtualearth.msn.com, pp. 1-3.

MSN Virtual Earth to Take on Google Earth, [online], [retrieved on Aug. 1, 2005]. Retrieved from the Internet <URL: http://blog.searchenginewatch.com/blog/050523-125208>, pp. 1-4.

MultiMap.com—Online Maps Everywhere, [online], [retrieved on Aug. 1, 2005]. Retrieved from the Internet <URL: http://multimaps.com>.

NASA World Wind, [online], [retrieved on Aug. 1, 2005]. Retrieved from the Internet <URL: http://worldwind.arc.nasa.gov/>, pp. 1-2.

Rabinovich, B., et al., "Visualization of Large Terrains in Resource-Limited Computing Environments," Proceedings of the 8th IEEE Visualization '97 Conference, Oct. 19-24, 1997, pp. 95-102, Phoenix, Arizona.

TerraServer-USA, [online], [retrieved on Aug. 1, 2005]. Retrieved from the Internet <URL: http://terraserver.homeadvisor.msn.com/>.

whereis.com—Search Australian Maps, [online], [retrieved on Aug. 1, 2005 ]. Retrieved from the Internet <URL: http://www.whereis.com/whereis/home.jsp>.

Yahoo! Maps, Driving Directions, and Traffic, [online], [retrieved on Aug. 1, 2005]. Retrieved from the Internet <URL: http://maps.yahoo.com>.

Burnett, G.E., ""Turn right at the King's Head" Drivers' requirements for route guidance information," A Doctoral Thesis of Loughborough University, Nov. 1998, [online] [retrieved on Feb. 22, 2010], Retrieved from the internet <URL: http://dspace.mit.edu/handle/1721.1/14225>.

Burnett, G.E., "Turn right at the traffic lights" The requirement for landmarks in vehicle navigation systems, The Journal of Navigation, 2000, p. 499-5010, vol. 53 No. 3.

Davis, J.R., "The Back Seat Driver: Real Time Spoken Driving Instructions," IEEE, 1989, pp. 146-150.

Supplementary European Search Report, European Patent Application No. 05726046, Nov. 6, 2008, 3 pages.

Canadian Office Action, Canadian Patent Application No. 2,560,560, Mar. 18, 2009, 2 pages.

Canadian Office Action, Canadian Patent Application No. 2,560,558, Aug. 7, 2009, 3 pages.

First Office Action of China State Intellectual Property Office, Chinese Patent Application No. 200580013512.0, May 8, 2009, 10 pages.

First Office Action of China State Intellectual Property Office, Chinese Patent Application No. 200580013912.1, Aug. 28, 2009, 16 pages.

Second Office Action of China State Intellectual Property Office, Chinese Patent Application No. 200580013512.0, Oct. 23, 2009, 8 Pages.

United States Office Action, U.S. Appl. No. 11/088,542, Dec. 3, 2008, 5 pages.

United States Office Action, U.S. Appl. No. 11/323,603, Jul. 29, 2009, 5 pages.

Brenner, C., et al., "Extracting Landmarks For Car Navigation Systems Using Existing GIS Databases And Laser Scanning," ISPRS Archives, Sep. 2003, 6 pages, vol. XXXIV, Part 3/W8.

Supplementary European Search Report, European Patent Application No. EP 05729642, May 12, 2010, 5 Pages.

Supplementary European Search Report for European Patent Application No. EP05713028, Sep. 6, 2010, 3 Pages.

Communication pursuant to Article 94(3) EPC, for European Patent Application No. EP05729642.8, Oct. 8, 2010, 6 Pages.

"Paid Search" Webopedia, 2010, 1 page, can be retrieved online at <URL:www.webopedia.com/TERM/P/paid_search.html>.

Maneesh Agrawala and Chris Stolte, "A Design and Implementation for Effective Computer-Generated Route Maps", Article, Mar. 2000, Computer Science Department, Stanford University.

\* cited by examiner

GENERATING HUMAN-CENTRIC DIRECTIONS IN MAPPING SYSTEMS

RELATED APPLICATIONS

This application is a continuation-in-part of U.S. application Ser. No. 11/181,386, filed Jul. 13, 2005, now U.S. Pat. No. 7,831,387 titled "Visually-Oriented Driving Directions in Digital Mapping System," which is related to U.S. application Ser. No. 11/088,542, filed Mar. 23, 2005, titled "Generating and Serving Tiles in a Digital Mapping System" (which claims the benefit of U.S. Provisional Application Nos. 60/650,840, filed Feb. 7, 2005, and 60/567,946, filed May 3, 2004, and 60/555,501, filed Mar. 23, 2004) and to U.S. application Ser. No. 11/051,534, filed Feb. 5, 2005, titled "A Digital Mapping System" (which claims the benefit of U.S. Provisional Application Nos. 60/567,946, filed May 3, 2004, and 60/555,501, filed Mar. 23, 2004). Each of these applications is herein incorporated in its entirety by reference.

FIELD OF THE INVENTION

The invention relates to digital mapping systems, and more particularly, to computer generated driving directions that are visually-oriented.

BACKGROUND OF THE INVENTION

Computerized mapping systems have been developed to search for, identify, and discover information about geographic locations. One form of such computerized mapping systems includes travel-planning Internet websites. With an excess of 50 million unique monthly users, such map sites are a very popular offering. Examples of such sites include AOL's MapQuest, Yahoo's Telcontar-based maps, and Microsoft's MapPoint.net suite. Such sites all work along the lines of a common model, as will now be described.

When a Web user asks for a new map view (e.g., by entering a postal address, or by clicking a navigation link next to a current map view), the user's Web browser sends to a Web server a request indicating the boundaries of the new map view. The Web server in turn extracts the corresponding vector-based map data from a database, and draws a bitmap image of the map. The server then converts the bitmap to an image format supported by the user's Web browser and returns the image, sometimes embedded in HTML, to the user's Web browser so that it can be displayed. Other map Web sites, such as Britain's MultiMaps or Australia's WhereIs utilize a raster-based map database instead. In these cases, it is not necessary to extract vectors and draw a map image. Rather, these functions are replaced by simply extracting the appropriate part of a larger, pre-rendered image.

Whether vector-based or raster-based, such existing map systems typically provide a computer-generated driving directions expressed in abstractions that are convenient for computers, such as "Stay on Main St. for 1.2 miles, and turn Right onto Center Street." Although such directions provide useful information that can be effectively employed to reach an intended destination, they can only be used in a literal sense. Other than the meaning of the words making up the directions, there is no further guidance to the user.

What is needed, therefore, are digital mapping techniques that provide more information to the user.

SUMMARY OF THE INVENTION

One embodiment of the present invention provides a computer implemented method for generating human-centric driving directions. The method includes generating a route in response to a user request for travel directions. The request specifies at least a target destination. The method continues with identifying distinctive waypoints along the route, wherein the waypoints are visual markers along the route and are in addition to road names and road topology. The method further includes incorporating one or more of the waypoints into travel directions responsive to the user request. In one particular case, identifying distinctive waypoints along the route includes identifying cross-streets that intersect each segment of the route (thereby defining route sub-segments between cross-streets), and identifying distinctive waypoints along one of more of the sub-segments. In another particular case, identifying distinctive waypoints along the route includes accessing a waypoint database. In one such case, the waypoint database lists businesses and their respective locations, and at least one of those businesses pay an advertising fee to have their location used as a waypoint in travel directions. In another particular case, incorporating one or more of the waypoints into travel directions includes selecting waypoints related to the target destination. In another particular case, incorporating one or more of the waypoints into travel directions includes generating textual directions that use natural language to communicate the travel directions. In one such case, generating textual directions that use natural language to communicate the travel directions includes receiving a high-level representation of a route segment including waypoints associated with that segment, and using human-centric phrases to generate the textual directions. The method may include annotating the travel directions to distinguish one or more phrases therein. The method may include sending the travel directions to the user for display, and/or sending the travel directions to the user for aural presentation. In one particular case, the method includes at least one of: annotating the travel directions to distinguish one or more phrases therein, sending the travel directions to the user for aural presentation, and high-lighting the one or more distinguished phrases by at least one of pitch and intonation changes.

Another embodiment of the present invention provides a machine-readable medium (e.g., one or more compact disks, diskettes, servers, memory sticks, or hard drives) encoded with instructions, that when executed by one or more processors, cause the processor to carry out a process for generating human-centric driving directions. This process can be, for example, similar to or a variation of the previously described method.

Another embodiment of the present invention provides a system for generating human-centric driving directions. The system functionality (e.g., such as that of the previously described method or a variation thereof) can be implemented with a number of means, such as software (e.g., executable instructions encoded on one or more computer-readable mediums), hardware (e.g., gate level logic or one or more ASICs), firmware (e.g., one or more microcontrollers with I/O capability and embedded routines for carrying out the functionality described herein), or some combination thereof. The techniques can be implemented, for example, using a tile-based mapping system. However, other systems, such as non-tile vector-based and raster-based mapping systems can be used to implement the methods as well, as will be apparent in light of this disclosure.

The features and advantages described herein are not all-inclusive and, in particular, many additional features and advantages will be apparent to one of ordinary skill in the art in view of the figures and description. Moreover, it should be noted that the language used in the specification has been

DETAILED DESCRIPTION OF THE INVENTION

Digital mapping techniques are disclosed that provide visually-oriented information to the user, such as driving directions, thereby improving the user experience.

General Overview

As previously explained, computer-generated driving directions are typically expressed in abstractions that are convenient for computers, such as "Stay on Main St. for 1.2 miles", etc. In contrast, human-generated directions tend to be more visually-oriented, such as "Stay on Main St, you'll pass a big Sears on your left, then turn right at the Dunkin Donuts". Through the use of satellite-based imagery and/or storefront images, a mapping system configured in accordance with an embodiment of the presenting invention can give more visually-oriented (and hence human-centric) directions.

For instance, satellite-based imagery (such as that provided by Google Earth or Digital Globe) can be used to identify salient buildings, structures, and/or areas for use as way points (e.g., a particularly large building, an isolated building, a baseball or other large stadium, a park in an otherwise urban area). In addition, using image interrogation techniques, structures such as traffic lights and stop signs can be identified, which are also useful in giving directions.

Similarly, storefront (street-level) images can be used to identify salient buildings and features, such as stores with large visible logos, stores of unusual colors (e.g., "the bright purple store"), stores that are easily recognized because their brands are well-known and/or their store architectures and tradedress are distinctive (e.g., "the McDonalds"). This last category involving well-known brands, trademarks, tradedress, etc. can be identifiable even without image information (e.g., most everyone knows what a McDonalds looks like). Such visual data can be used to identify the target address, such as "Fred's Shoe Repair is in the middle of the block, just past the bright purple store".

The user can preview the driving route by a simulated drive-through or "fly-through" using the satellite/street-level images, in conjunction with the relevant digital maps. Thus, when the user actually drives to their targeted destination, the visual cues in the directions will remind the user of what to look for, and give that user a greater sense of confidence that he or she is on the right track. Likewise, the user can preview or otherwise receive the driving route by listening to spoken directions (wherein the system employs voice generation techniques that verbalize the human-centric directions). With such an embodiment, when the user travels to their targeted destination, the verbal cues in the directions will remind the user of what to look for, or otherwise guide the user in a similar fashion to visually presented human-centric directions.

The techniques can be employed in any number of applications, such as desktop mapping systems, portable device mapping systems (e.g., smart phones and PDAs), and in-car navigation systems. Numerous other benefits will be apparent in light of this disclosure.

System Architecture

Figure 1:
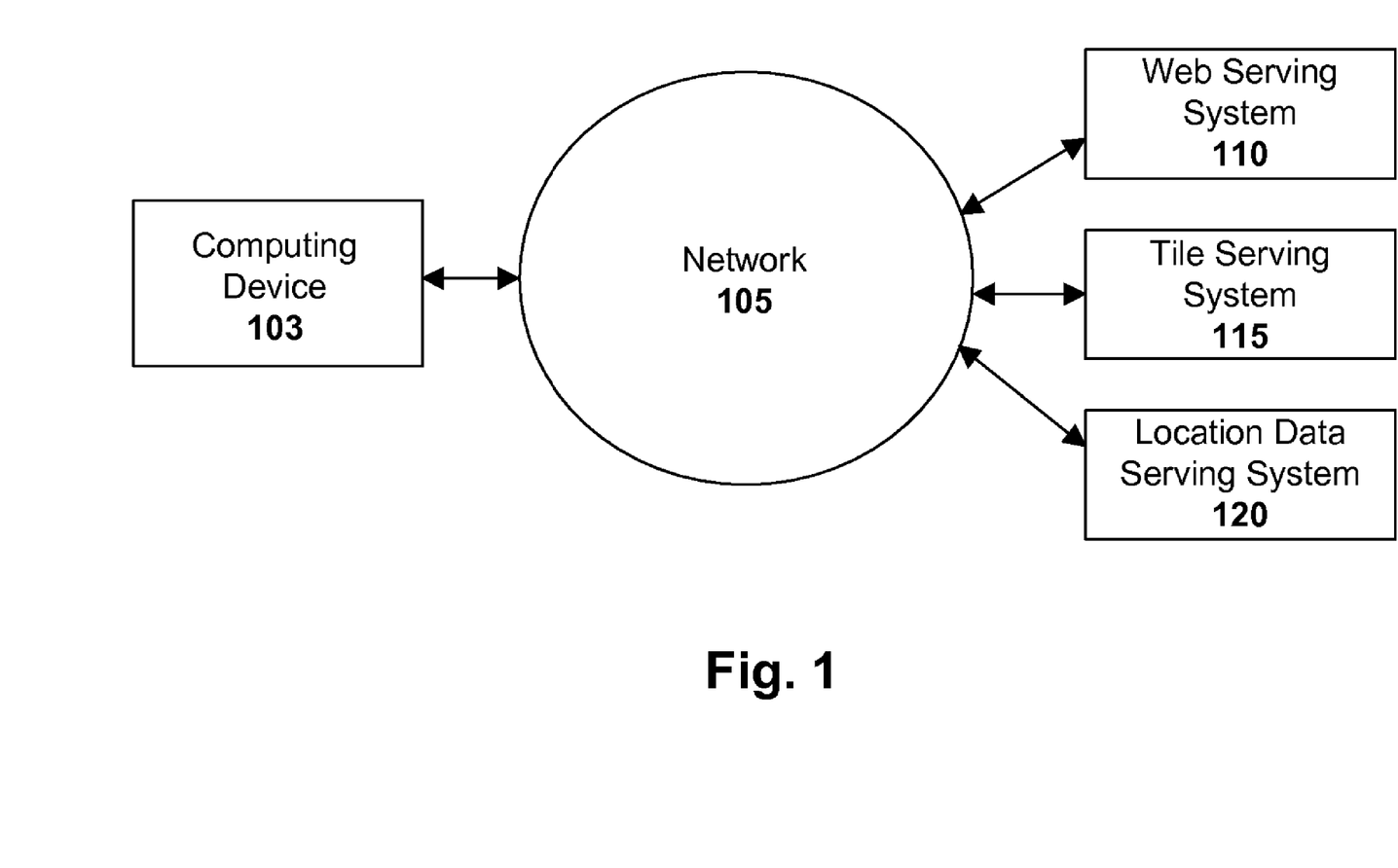
FIG. 1 is a block diagram of a digital mapping system configured to provide visually-oriented driving directions, in accordance with one embodiment of the present invention.

FIG. 1 is a block diagram of a tile-based digital mapping system configured in accordance with one embodiment of the present invention. As can be seen, the system includes a computing device 103 connected to a network 105. Various serving systems are also connected to the network 105, including a web serving system 110, a tile serving system 115, and a location data serving system 120. Other computing devices 103 (not shown) may also be in communication with the serving systems 110, 115, and 120 via the network 105.

The computing device 103 may be any type of device configured for computing, such as a personal computer or laptop, a mobile phone, a PDA, a navigation system located in a vehicle, a handheld GPS system, and so on. The computing device 103 includes a browser (or other similar application) that allows the user to interface and communicate with other devices and systems on the network 105. Examples of browsers include Microsoft's Internet Explorer browser, Netscape's Navigator browser, Mozilla's Firefox browser, PalmSource's Web Browser, or any other browsing or application software capable of communicating with network 105. Generally stated, the computing device 103 can be any device that allows a user to access the serving systems 110, 115, and 120 via the network 105.

The web serving system 110 is the part of an overall system that delivers the initial HTML (hypertext markup language), images, scripting language (e.g., JavaScript, JScript, Visual Basic Script), XSLT (extensible stylesheet language transformation), and other static elements that are used by the browser on computing device 103. Note that this serving system 110 may include one or more servers operating under a load balancing scheme, with each server (or a combination of servers) configured to respond to and interact with the computing device 103. The web serving system 110 can be implemented with conventional technology, as will be apparent in light of this disclosure.

The tile serving system 115 is the part of the overall system responsible for delivering individual map tiles in response to requests from the computing device 103, with each tile being uniquely defined, for example, by x, y and z values that coordinates to an overall tile-based map. Other tile identification schemes can be used as well. The tile serving system 115 may include one or more servers operating under a load balancing scheme, with each server (or a combination of servers) configured to respond to and interact with the computing device 103. Example architecture and functionality of the tile serving system 115 is further discussed in the previously incorporated U.S. application Ser. No. 11/088,542.

The location data serving system 120 is the part of the overall system that delivers location data of various forms to the computing device 103. Its functions include, for example, finding the geographic location of a street address, generating and formatting human-centric driving directions, and searching for location-specific results to a query (e.g., as with the Google Local Search service). Other services may also be provided. In general, when the user enters a search string, it is put into a request by the computing device 103, and sent to the location data serving system 120 via the network 105. The location data serving system 120 then determines what the request is for (e.g., generate driving directions with visual "fly-through" of route, or generate human-centric driving directions in textual or verbal format, or generate some combination of textual directions, verbal directions, and visual "fly-through" of route), and responds with the appropriate data from various sub-systems, such as geo-coders, routing engines, and local search indexes or databases (e.g., including a scored waypoint database), in a format that computing device 103 can use to present the data to the user (e.g., via a browser). Example architecture and functionality of the location data serving system 120 will be discussed in turn with reference to FIGS. 2-4.

The network 105 may be any type of communications network, such as a local area network (e.g., intranet), wide area network (e.g., internet), or some combination thereof. Alternatively, the network 105 may be a direct connection between the computing device 103 and the serving systems 110, 115, and 120. In general, the computing device 103, network 105, and/or serving systems 110, 115, and 120 may be in communication via any type of wired or wireless connection, using a wide variety of communication protocols.

Location Data Serving System

Figure 2:
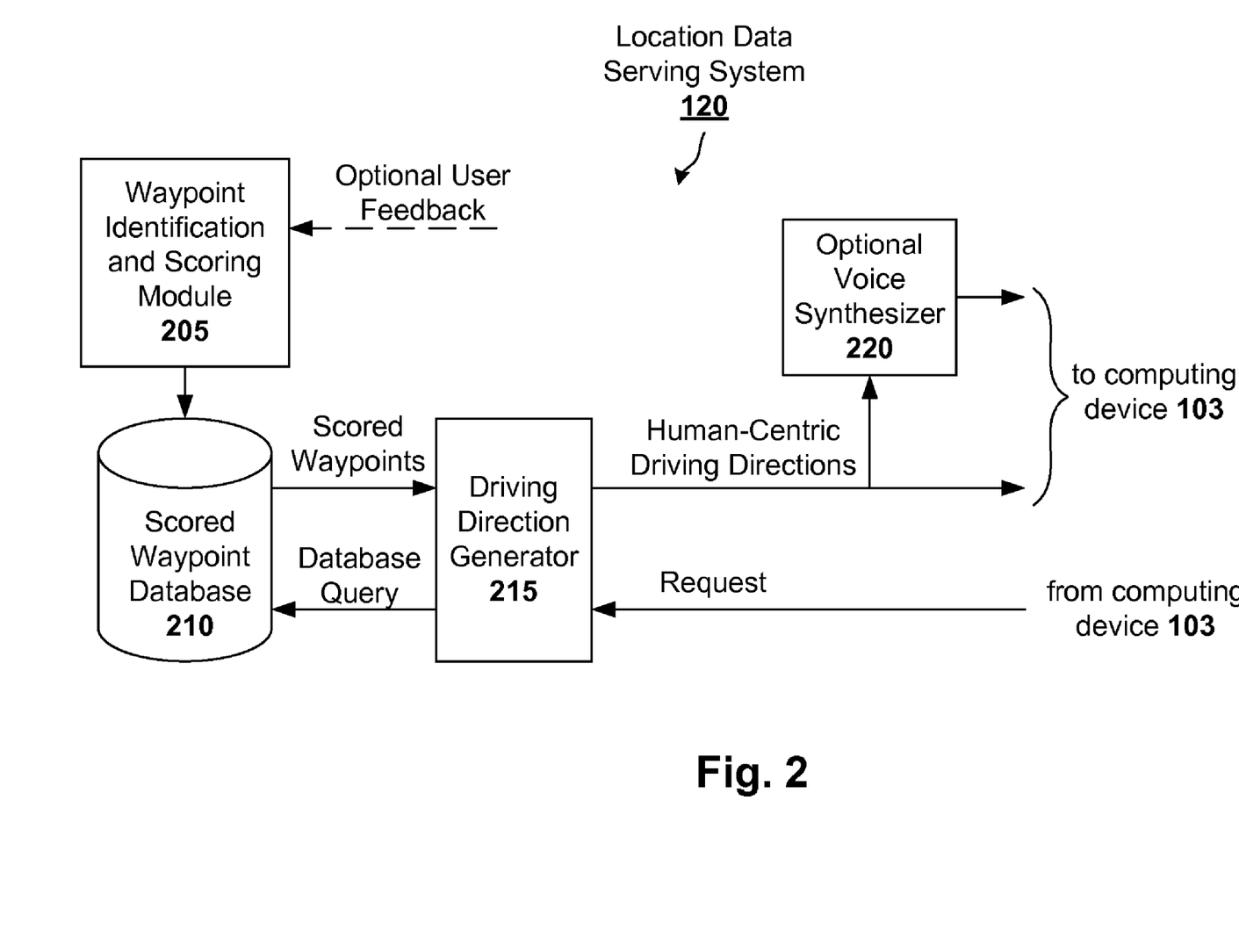
FIG. 2 is a block diagram of the location data serving system shown in FIG. 1, configured for generating visually-oriented driving directions in accordance with one embodiment of the present invention.

FIG. 2 is a block diagram of the location data serving system 120 shown in FIG. 1, configured for generating visually-oriented driving directions in accordance with one embodiment of the present invention. As can be seen, the system 120 includes a waypoint identification and scoring module 205, a scored waypoint database 210, a driving direction generator 215, and an optional voice synthesizer 220.

As previously discussed, the location data serving system 120 can be part of the overall digital mapping system that delivers mapping data of various forms (e.g., location data, map images, etc) to the computing device 103. In this particular embodiment, the location data is in the form of human-centric driving directions (e.g., textual, graphical, and/or verbal). Note that these driving directions can be provided in conjunction with a map that includes an overlay of the driving directions in graphical form as well. For instance, in the embodiment shown in FIG. 1, the digital mapping system is configured to provide tile-based maps, as explained in detail in the previously incorporated U.S. application Ser. Nos. 11/088,542 and 11/051,534. However, the present invention is not intended to be limited to systems that provide tile-based maps. Rather, embodiments of the present invention can also be used with other systems, such as non-tile vector-based and raster-based mapping systems. Likewise, other embodiments of the present invention can be used to provide textual and/or verbal human-centric driving directions (with no map or other graphics). Numerous mapping and guidance system configurations can be used. The description herein focuses on the human-centric driving directions component of the system. Other components and map system functionality not shown or otherwise discussed, whether conventional or custom, can be used as desired in conjunction with human-centric driving directions, as will be apparent in light of this disclosure.

In the embodiment shown in FIG. 2, the location data serving system 120 operates in both an off-line capacity, as well as in an on-line capacity. In particular, "scored waypoints" are generated by the waypoint identification and scoring module 205 in an off-line process, and stored in the scored waypoint database 210. This off-line process effectively stocks the database 210 with waypoints and their corresponding distinctiveness scores. During on-line operations, requests (e.g., HTTP or other suitable protocol) for driving directions are received by the driving direction generator 215. The request can be initiated, for example, by a user engaging a web browser (or other suitable application) of a computing device 103 to access the system. In response to such a client request, the driving direction generator 215 accesses the scored waypoint database 210 and integrates the relevant scored waypoints into the driving directions generated in response to the request.

These human-centric driving directions can then be served or otherwise transmitted to the requester via the network 105 and computing device 103. In one embodiment, the driving directions are served in a textual format (along with map data/graphics, if so desired). Alternatively, or in addition to, the generated human-centric driving directions can be applied to the voice synthesizer 220 for conversion to the spoken equivalent of the textual format. Conventional or custom voice synthesis techniques can be used to implement synthesizer 220. This voice data can then be transmitted to the computing device 103 for aural presentation. If both textual and verbal formats are used, the data comprising the verbal and textual components can be transmitted together in a common transmission or in two (or more) separate transmissions, if so desired. Verbal directions can be buffered at the computing device 103 for synchronization purposes (e.g., so that the verbal directions are aurally presented contemporaneously with the display of textual/visual directions), as well as for playback purposes (e.g., user can pause, rewind, and play/replay directions). Directions may also be stored at the computing device 103 for subsequent recall, without having to re-engage the serving system.

A waypoint is a visual data point along the way of a driving route, such as a building, business, park, billboard, points-of-interest, or some other visually noticeable/recognizable structure or place. The distinctiveness of the waypoint is indicative of its visual prominence. Color (e.g., purple), shape (e.g., round building), size (e.g., 7 mile long park), degree of landmark recognition (e.g., Golden Gate Bridge), and/or degree of brand recognition (e.g., Golden Arches) are example factors that can be used to evaluate the distinctiveness of a waypoint. Waypoints can be obtained from several sources. For instance, waypoints can be obtained from one or more online databases made up of businesses that have registered with the system. Similarly, waypoints can be obtained by scanning various publicly accessible databases of business listings and directories. Likewise, waypoints can be prominent locations that have been automatically identified from maps data (e.g., TIGER maps data from the U.S. Census Bureau provides such information). Also, waypoints can be based on user input, such as locations on maps tagged by different user communities to identify points-of-interests, and such annotations can be shared among that community of users. Also, individual users can identify salient features that they find significant or otherwise usable in providing human-centric directions (e.g., while initially obtaining the route, one might identify the on-ramp to a freeway, and later have this feature used in the directions that are generated).

In addition to the textual/verbal driving directions, the digital mapping system in which the location data serving system 120 operates may also generate and serve graphical map data relevant to the client request. In one such embodiment, the computing device 103 receives the requested graphical map data, and requests any map tiles it doesn't already have displayed or cached (e.g., as explained in the previously incorporated U.S. application Ser. No. 11/051,534). When the tiles are received from the server-side of the digital mapping system (e.g., from the tile serving systems 115), the computing device 103 draws and displays the map, along with the visually-oriented driving directions. The client-side can also be used to draw (e.g., overlay) the graphical driving directions, location markers, etc on the map image. Note here that the distinctive waypoints can also be overlaid on the map, along with the route itself. Other computing device 103 functionality will be apparent in light of this disclosure. For example, the voice synthesizing function of synthesizer 220 can be integrated into the computing device 103.

Waypoint Identification and Scoring

Figure 3:
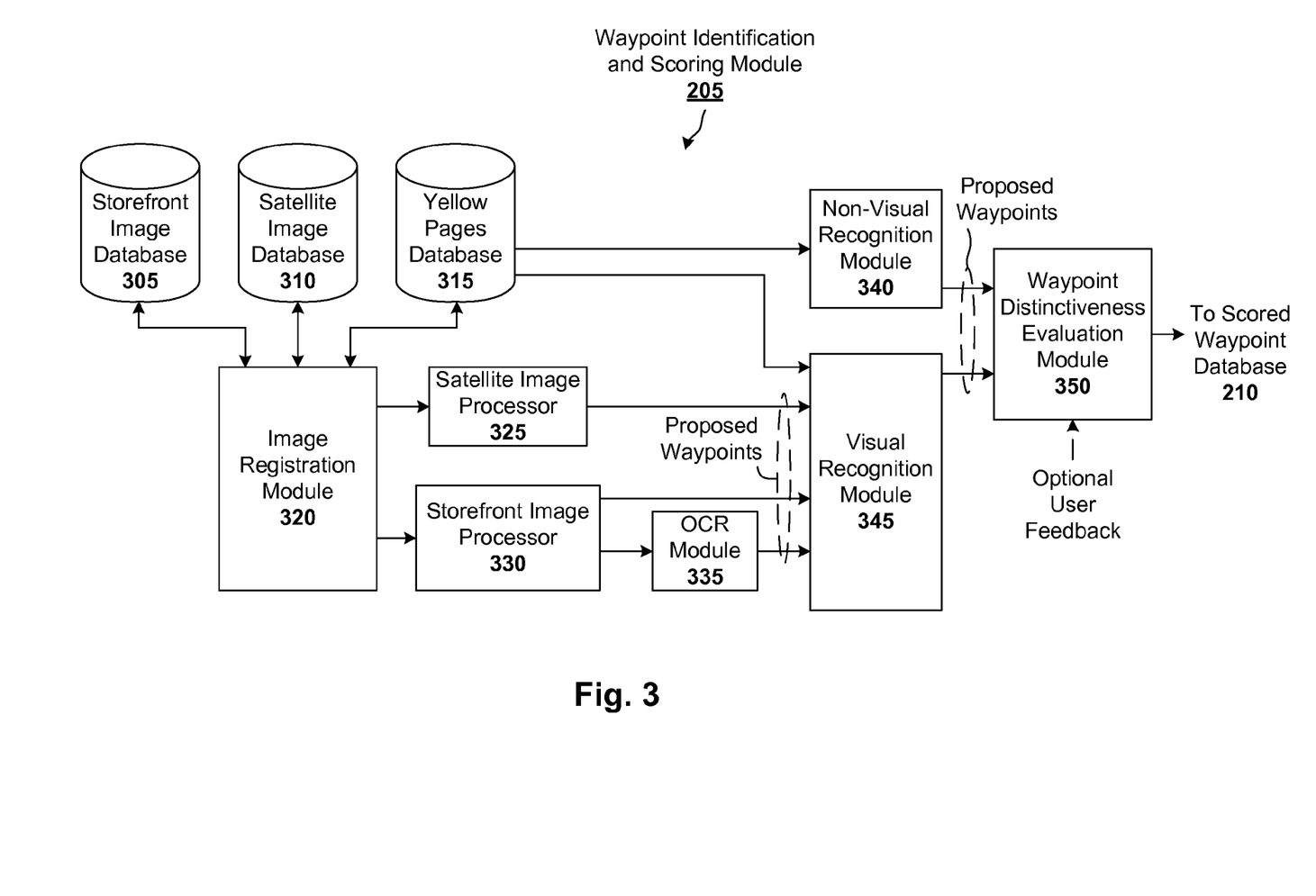
FIG. 3 is a block diagram of the waypoint identification and scoring module shown in FIG. 2, configured for generating scored waypoints for use in visually-oriented driving directions, in accordance with one embodiment of the present invention.

FIG. 3 is a block diagram of the waypoint identification and scoring module 205 shown in FIG. 2, configured for generating scored waypoints for use in visually-oriented driving directions (textual, graphical and/or verbal directions), in accordance with one embodiment of the present invention. The module 205 generates scored waypoints, which can then be stored in scored waypoint database 210. These scored waypoints can then be accessed by a driving direction generator to create visually-oriented driving directions.

As can be seen, the module 205 includes a storefront image database 305, a satellite image database 310, a yellow pages database 315, an image registration module 320, a satellite image processor 325, a storefront image process 330, an optical character recognition (OCR) module 335, a non-visual recognition module 340, a visual recognition module 345, and a waypoint distinctiveness evaluation module 350. Numerous variations on this configuration for generating scored waypoints will be apparent in light of this disclosure, and the present invention is not intended to be limited to any one such embodiment.

In operation at pre-processing time (off-line), the waypoint identification and scoring module 205 employs one or more a databases of images (e.g., storefront image database 305 and satellite image database 310), together with a corresponding database of business listings (e.g., yellow pages database 315). Each database can be structured to facilitate efficient access of data, and include various types of information. For example, each street-level image (e.g., digital photograph taken using a GPS-enable camera) stored in the storefront image database 305 can be indexed by geocode, and associated with corresponding GPS coordinates. Likewise, each satellite image stored in the satellite image database 310 can be indexed by geocode, and associated with corresponding GPS coordinates. The yellow pages database 315 can be structured, for example, as conventionally done.

In an alternative embodiment, the illustrated databases are integrated into a single database. Also, other databases or information sets could be included, such as a conventional white pages database or other such listing service databases. Further note that the image databases may include multiple views and/or zoom levels of each targeted area. For instance, one storefront image can be taken from an angle as it would be seen coming down one direction of the street, while another storefront image of the same address could be taken from an angle as it would be seen coming down the other direction of the street. Thus, depending on the driving directions, either image could be used.

The image registration module 320 is programmed or otherwise configured to construct a mapping between images and business listings. In one embodiment, this mapping is accomplished by a combination of image segmentation using standard image-processing techniques (e.g., edge detection, etc.) and interpolation of a business's street address within the range of street addresses known to be contained in the image. Image registration is done for both storefront images and satellite images. The mapping can be implemented, for example, with a pointer or address scheme that effectively connects images from an image database to listings in the yellow pages database. Alternatively, a single database can be built as the image registration process is carried out, where the records of the single database are indexed by geocode, and each record includes image data and related yellow page listing information.

In the embodiment shown, image processing is performed by accessing the images by way of the image registration module 320 (e.g., which can access the images stored in the respective databases 305 and 310 using a pointer or addressing scheme). Other embodiments can access the images directly from their respective databases. In any case, image processing is performed to propose candidate waypoints based on detected visual features.

In more detail, the satellite image processor 325 is programmed or otherwise configured to recognize navigational features included in the satellite images. Certain navigational features are particularly useful for drivers, because a driver has to attend to such features anyway, including the likes of traffic lights, stop signs, on/off-ramps, traffic circles, city blocks, tunnels, bridges, end-of-divided-highway, and other driver-centric features. These navigational features facilitate human directions such as: "turn right at the third light", "get off at the second off-ramp", and "go through 2 traffic circles and then it's on your right."

In one particular embodiment, the satellite image processor 325 uses standard machine-learning techniques to learn to recognize these navigational features from the satellite images. In one such approach, humans annotate a set of satellite images with instances of the desired feature (e.g., all traffic circles), and then use standard machine-learning algorithms (e.g., SVMs, boosting over decision stumps, decision lists, etc.) to learn image features that correctly predict the occurrence of that feature. Once trained, the machine-learning algorithms can be used to recognize the learned or known navigational features in all the satellite images. These identified features can then be evaluated for use as waypoints.

In addition to learning from satellite images, many navigational features can be learned from GPS/accelerometer data associated with the storefront (street-level) images, as will be explained in turn.

The storefront image processor 330 is programmed or otherwise configured to analyze storefront images. In one embodiment, this analysis is carried out at both a coarse level (e.g., width, height, color histograms) and a more refined level (e.g., segmentation into facade, doors, windows, roof, architectural elements such as pillars and balconies; decorative elements such as awnings, signage, neon lights, painted designs). Such analysis can be carried out, for example, using standard image-processing techniques (e.g., computer vision). Standard feature extraction algorithms typically extract high level information from images, such as shapes, colors, etc. Pattern recognition algorithms can then be applied to classify the extracted information so as to "recognize" objects in the storefront images.

In addition to learning navigational features from satellite images, many navigational features can be learned from GPS/accelerometer data associated with the storefront images taken at the street-level. For instance, when collecting storefront images (e.g., using a digital camera in a car that is equipped with GPS receiver and an accelerometer), GPS and 3-D accelerometer readings could also be collected for each photographic image taken. Certain navigational features are associated with a particular set of associated readings. For example: on-ramps would have strong acceleration, and off-ramps would have strong deceleration; and traffic lights would have deceleration to zero, followed at regular intervals by acceleration. The GPS could be used to record where these acceleration/deceleration patterns occurred. Once the position of these navigational features (e.g., on-ramps, off-ramps, and lights) are learned, they can be used in giving driving directions.

All of these identified features can then be evaluated for use as waypoints. For instance, waypoints can be proposed based on observed locally distinctive or otherwise salient features, including any measurable dimension or highly noticeable quality (e.g., unusually wide/narrow/tall/short building, building with purple door, orange or red roof, green neon sign, etc). If a feature is "locally distinctive", it is unique within some vicinity, such as the only pink building on the block. The features discussed so far are intrinsic to the building, but extrinsic features can also be used (e.g., the building at the corner, the first building after the railroad tracks, etc).

While the storefront image processor 330 can be used to detect decorative and structural features within the images, the OCR module 335 can be applied to the storefront images to read the storefront signage (if any), using standard OCR algorithms and techniques. This text recognition enables waypoint proposal of visual features such as "the bar with the neon Karaoke sign in the window." In one particular embodiment, the OCR accuracy of module 335 can be improved by identifying what kind of a store is in the storefront image, based on its corresponding category listing (e.g., bars and restaurants) in the yellow pages database 315. Recall that the image registration module 320 has already mapped the images to corresponding listings within the yellow pages database 315, thereby facilitating this context identification for the OCR process. In addition, text related to that yellow pages category can be obtained, for example, by visiting web sites of stores in that category, and adjusting the language model used for OCR module 335, accordingly. This supplemental information from yellow page listings and/or websites enables the OCR module 335 to be informed of the context in which it is operating.

The visual recognition module 345 receives the proposed waypoint information output by each of the image processors 325 and 330, and the OCR module 335. The visual recognition module 345 is programmed or otherwise configured to perform visual learning based on established knowledge. For instance, in one particular embodiment, the visual recognition module 345 recognizes chain stores. Chain stores (e.g., McDonalds) are a common element in human-generated directions. In particular, the visual recognition module 345 can learn which chain stores have distinctive logos/buildings by, for example, identifying common elements across storefront images of multiple branches using the results of the storefront image processor 330 and OCR module 335, combined with yellow page listings and standard translation/rotation/scaling transformations to align multiple images, and even simpler image-processing techniques such as orientation histograms.

For example, the visual recognition module 345 would discover that McDonalds frequently have the same logo (e.g., the word "McDonalds" in a particular color and font), a glass storefront, Golden Arches, etc. In this sense, the visual recognition module 345 learns a prototype of what the target chain store typically looks like. In addition, the visual recognition module 345 identifies the extent to which each branch of the chain store at a given address matches the prototype. If a McDonalds branch at a given address sufficiently matches the common McDonalds' features found in the prototype, that McDonalds branch is a useful waypoint to use in driving directions, because it will be easily recognized by humans as a McDonalds. The combination of these two features (prototyping and comparison to prototype) improves the system's reliability in finding useful waypoints. Note that a given chain-store branch may actually be a "bad" waypoint if, for instance, it doesn't match the prototype well. For example, a McDonalds in an upscale neighborhood may be required to conform to the prevailing local architecture (e.g., no large Golden Arches allowed), thus reducing its recognizability as a McDonalds. Likewise, a given chain-store branch may actually be a "bad" waypoint if, for instance, that particular branch is not clearly visible from the road (e.g., obscured by foliage or other buildings). The visual recognition module 345 will avoid using such branches of the chain store as waypoints, thereby further refining results from the image processors 325 and 330, and the OCR module 335.

Practically speaking, McDonalds is well-known and fairly consistent in its appearance (even when restricted by local ordinance), and may not need to be processed by the visual recognition module (e.g., McDonalds image and address data could simply pass through the visual recognition module 345 as a proposed waypoint for a given area). Note that the non-visual recognition module 340 can be used to identify McDonalds and other well-known architectures, as will be apparent in light of this disclosure. On the other hand, a more regional restaurant chain that is less well-known, but fairly consistent in its appearance, could be identified as a waypoint of comparable efficacy to McDonalds by the visual recognition module 345.

Unlike the visual recognition module 345, the non-visual recognition module 340 can be used to recognize chain stores (and other such consistent structures and the like) without reference to any images. Rather, only address information (e.g., from the yellow pages database 315 in this embodiment) is needed. For instance, instead of learning from images of multiple branches of a chain store, heuristics about store recognizability can be used.

For example, gas stations are often good, recognizable waypoints because they tend to display their logo prominently, and have distinctive architecture (e.g., canopy over gas pumps and ample signage). Likewise, stores with a multitude of branches (e.g., over 1000) in the yellow pages tend to have distinctive branding and widespread marketing, and are typically well-recognized. Similarly, chain grocery stores often have large logos, large buildings, and large parking lots. In addition, they are typically well-known in the communities in which they exist. In any such cases, the non-visual recognition module 340 uses address listings to identify chain stores and other predictable/consistent architectures that are known to be distinctive, and proposes them as waypoints.

The waypoint distinctiveness evaluation module 350 evaluates the distinctiveness of the proposed waypoints received from the non-visual recognition module 340 and the visual recognition module 345. The distinctiveness measure can range, for example, from 1 to 10, and can take into account a number of aspects, where a distinctiveness score of 1 is indicative of a low distinctiveness rating, and a distinctiveness score of 10 is indicative of a high distinctiveness rating. In one particular embodiment, one or more of the following factors are considered in assigning a distinctiveness score: the magnitude of difference of the waypoint and its surroundings such as neighbors and open space (e.g., bright red is far away from white in color-space); the scope of the difference (e.g., the only bright red building on an entire block is more distinctive than a bright red building with another bright red building 2 doors down); the salience of a waypoint (e.g., a bright red door is less salient than a bright red entire facade); the visibility of the waypoint (e.g., a building separated from its neighbors by an empty lot may be easier to spot than a store in a row of connected buildings); and the familiarity of the pattern associated with the waypoint (e.g., in the case of chain stores that have very familiar branding).

Incorporating Waypoints into Driving Directions

Having identified waypoints and their distinctiveness scores, they can be used in several ways when generating driving directions (e.g., using the driving directions generator 215). For instance, turns can be identified using waypoints at or near an intersection (e.g., "you'll see a McDonalds on your right and a Mobil station on your left" or "turn right just past the Home Depot on your right"). In one particular embodiment, the waypoints that are given are on the same side of the street as the turn (e.g., waypoints on the right-hand side for right turns), so drivers can focus on one side of the road at a time. Confirmatory waypoints can be provided, such as "You'll pass a Safeway on your left, then a large park on your right." Also, "gone too far" waypoints can be given, such as "If you see a Tower Records on your right, you've gone too far." Waypoints can also be used as early warning indicators, to signal the driver to start watching for a turn, especially if the driver has been on the same road for awhile ("you'll be on Center St. for 20 miles; after you pass the Crabtree Shopping Center on your left, start watching for your left turn"). Waypoints can also be used to identify the target destination (e.g., "your destination is the three-story white house on the left" or "you'll see the Fry's on your right; look for the big red logo"). The entire route can be chosen with the quality of waypoints in mind. For instance, the user can be directed along a somewhat longer route if the longer path affords better waypoints. In one particular embodiment, the user can be offered a choice of maximizing "ease of following directions" versus "shortest distance" (or other such alternatives).

In all of these uses of waypoints, there is a balance between choosing a waypoint in exactly the desired location with choosing a waypoint with a higher distinctiveness score. For example, it may be better to direct the user as follows: "Your destination is the third house after the big red building" compared to: "Your destination is the house on the left with a brown front door." Note also that streets can be used as waypoints (e.g., "It's the first right-hand turn after you cross Maple St."). In such an embodiment, the waypoint distinctiveness evaluation module 350 is configured to score the salience of streets (e.g., "large street with two lanes in each direction" or "a boulevard with grassy median").

The driving directions can be generated using conventional technology or as described in the previously incorporated U.S. application Ser. Nos. 11/088,542 and 11/051,534, with the addition of the incorporation of one or more of the scored waypoints. In one embodiment, the waypoints are incorporated into a pre-selected set of driving directions, where conventional driving directions are generated, and then effectively annotated with waypoints. These waypoints can be added to the driving directions as text (as in the previously given examples) and/or as images (e.g., McDonalds icon). Once textual driving directions with the waypoints are generated, those directions can be converted to verbal directions, using a voice synthesizer as previously discussed. Thus, the user can be given a choice of textual, graphical, and/or verbal presentation of the driving directions. As will be apparent in light of this disclosure, such human-centric driving directions can also be generated for a plurality of routes, and taking the waypoint scores along each route into account when selecting the best route to give.

User Feedback

In one embodiment, a mechanism for collecting feedback from users as to the utility of different waypoints is provided. For example, a GPS record can be generated of the user's actual route taken when attempting to follow the served driving directions (e.g., from a handheld GPS receiver/recorder, or an on-board GPS navigation system, or a GPS-enabled cellphone). The reporting of GPS data can be transparent to the user, and/or enabled by the user.

In one particular embodiment, a user feedback module is downloaded into the user's browser or other such client application running on the user computing device, and is programmed to receive the GPS data and report it back to the serving system. An alternate feedback approach that can be used is to provide a form (e.g., online webform or email, and/or paper/fax submissions) for users to fill out and send back with positive/negative feedback about each step of the visually-oriented driving directions. The user feedback could be used, for example, by the waypoint distinctiveness evaluation module 350 to reduce the distinctiveness score of waypoint(s) that were used to indicate a turn that the user missed, or to increase the distinctiveness score of waypoint(s) that were used to indicate a turn that the user found.

Feedback from multiple users could be categorized and tallied by waypoint, so that a meaningful sample of feedback data could be analyzed when upgrading/downgrading the distinctiveness score of a waypoint, thereby eliminating or otherwise reducing the impact of anomalies or individual biases regarding a particular waypoint. Numerous statistical techniques can be used to properly value the user feedback. In addition to providing feedback on existing waypoints, such a network of users can provide input to effectively create a community-generated set of waypoints that can be used in generating human-centric directions as discussed herein.

Advertising

In one particular embodiment, businesses are allowed to bid or otherwise pay to be included as a waypoint. The "cost-per-use" of a waypoint could then be an additional factor that would be taken into account when scoring each waypoint. Furthermore, incorporating one or more of the scored waypoints into requested driving directions could include selecting waypoints related to a destination of the requester. For instance, if the user is asking for driving directions to a national park, then waypoints such as camping equipment stores could be selected for integration into the served driving directions. This choice of waypoints has several benefits: (1) the waypoints might be of interest in their own right; (2) the waypoints are more likely to be familiar to the user and thus better waypoints; and (3) advertisers would be likely to pay more for such targeted waypoint usage.

Previews

In one embodiment, fly-throughs (e.g., using satellite images) or walkthroughs (e.g., using storefront images) of the user's route could be provided, in addition to the visually-oriented driving directions. This would better prepare the user visually for following the directions, as they would be able to see the waypoints referenced in the driving directions ahead of time. In addition, photos of the waypoints and intersections could be printed in advance by the user to aid the user in spotting them when driving the actual route.

In one particular embodiment, an "autoplay preview" feature is provided on the client-side. When selected by the user, a request for preview data would be sent to the server-side. The client could initially be given the entire route, which can be represented, for example, as a sequence of latitude/longitude pairs of line segments approximating the path. The client can then use simple linear interpolation to follow the route.

For instance, the client could display a map (e.g., satellite map or bitmap map) centered initially at the starting point of the route, with a progress marker (e.g., a car icon), and would continuously scroll the display along the desired route. Movement of the progress marker could be carried out using script code (e.g., JavaScript) executing on the client. The client could pre-fetch map tiles (or other map image/data) in conjunction with moving the progress marker to create an uninterrupted viewing experience.

An analogous pre-fetching scheme could be used for displaying storefront images along the route, which may be more meaningful to the user, given the ease of perceiving street-level images. A perspective transformation can be used to show the storefronts on both sides of the street as the user drives (or walks) along the route. Other elements can be added to the preview as desired, such as traffic lights, street signs, and even simulated other cars, etc., to enhance realism. In one such embodiment, the user is able to control the playback (e.g., via start/stop/pause/reverse control objects included in the user interface).

In one particular configuration, the user is allowed to divert from the original route, so as to explore alternate routes and the surrounding area ("virtual reconnaissance"). Note in this latter case, however, that pre-fetching becomes more difficult. To reduce latency of such real-time image delivery, predictive caching of the relevant map images/storefront images can be used based on the user's current direction and previous use habits. A number of predictive caching and image delivery schemes can be used, as will be apparent in light of this disclosure.

Methodology

Figure 4:
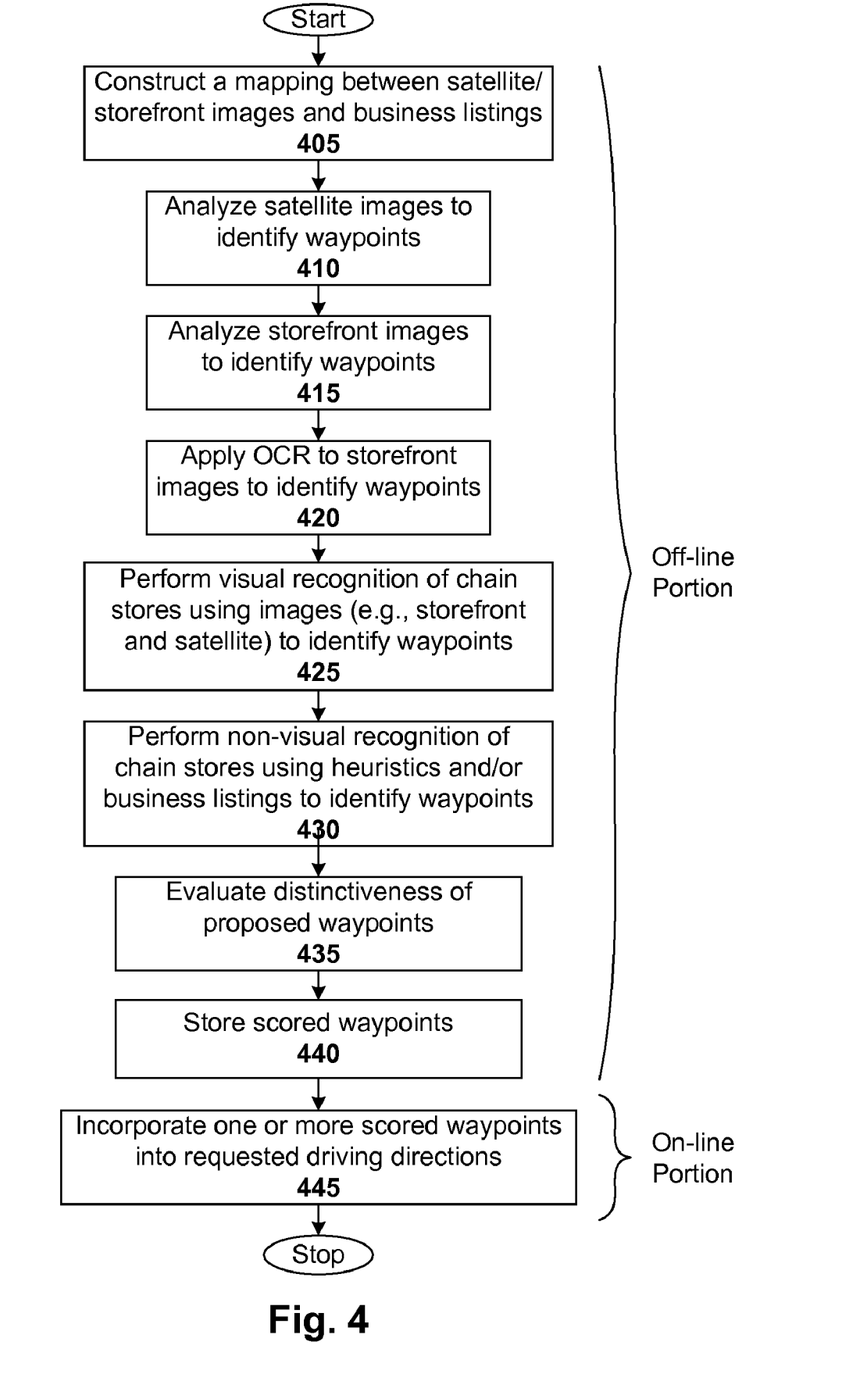
FIG. 4 illustrates a method for generating visually-oriented driving directions, in accordance with one embodiment of the present invention.

FIG. 4 illustrates a method for generating visually-oriented driving directions, in accordance with one embodiment of the present invention. The method can be carried out, for example, using the systems of FIGS. 1-3. However, any mapping system can integrate the methodology.

As can be seen, the method includes an off-line portion and an on-line portion. The off-line portion includes constructing 405 a mapping between business listings and satellite and storefront images of the target map area. The method continues with analyzing 410 the satellite images to identify waypoints, and analyzing 415 the storefront images to identify waypoints. The method further includes applying 420 OCR to storefront images to identify waypoints. As previously explained, image analysis can be used to detect decorative and structural features within the images, and OCR can be used to detect the storefront signage.

The off-line portion of the method continues with performing 425 visual recognition of chain stores using images (e.g., storefront and satellite) to identify waypoints. As previously explained, the yellow pages (or other such listings) can be used to identify the addresses of all locations of a particular chain store, and then images of those locations can be analyzed to identify the common elements across the images. Chain stores with such consistent elements can be used as waypoints, as they are likely to be recognized.

The off-line portion of the method also includes performing 430 non-visual recognition of chain stores using heuristics and/or business listings to identify waypoints. As previously explained, there are many rules of thumb that can be applied to identify waypoints, without using image data. In addition, both visual (e.g., machine learning) and non-visual (e.g., GPS/acceleration data collection) techniques can be used to identify navigational features, which can also be used as waypoints.

The method continues with evaluating 435 the distinctiveness of the proposes waypoints. The distinctiveness measure can range, for example, from 1 (low distinctiveness) to 10 (high distinctiveness), and takes into account a number of factors as previously explained. Numerous rating schemes are possible, and the end result is a number of scored waypoints. The off-line portion of the method further includes storing 440 the scored waypoints The on-line portion of the method includes incorporating 445 one or more scored waypoints into requested driving directions. As previously explained, when a request for written driving directions is received from a client, a driving direction generator on the server-side accesses the stored waypoints, and generates visually-oriented written driving directions, which are sent back to the client. In addition to the written driving directions, the server-side could also send graphical map data. Alternatively, or in addition to, the written driving directions can be converted to verbal directions (either at the server or at the requesting client), so that they can be aurally presented to the user. In one particular embodiment, the client receives the graphical map data, and requests any map tiles (or other image data) it doesn't already have displayed or cached. When the tiles are received from the server-side, the client draws and displays the map, along with the visually-oriented driving directions. The client-side can also be used to draw (overlay) the graphical driving directions, location markers, waypoints, etc. on the displayed map image.

One example operation employing the architecture and methodology described herein is as follows. The user generates a map query by specifying start and stop locations via a user interface to the mapping system (e.g., desktop mapping system or in-car navigation system). The query is received and processed by the mapping system backend (e.g., location data serving system 120) to identify start and stop locations. An initial route is computed from the start location to the stop location (e.g., driving direction generator 215). For this computed route, cross-streets are identified that intersect each segment of the computed route (e.g., driving direction generator 215). These cross-streets determine the sub-segments. Assume a route segment is a portion of a route between two maneuvers, where a maneuver commonly denotes a turn, but may be anything that requires action or extra attention by the traveler (e.g., such as "merge onto . . . " or "continue on", or "board the #65 bus"), while a sub-segment denotes the portion of a segment between two cross streets. For each segment, and the associated sub-segments, the route generator (e.g., driving direction generator 215) looks-up known waypoints (e.g., stored in database 210; recall that merchants can have their businesses listed in the database and have their location used as a waypoint for an appropriate advertising fee) that lie along that portion of the route. The route generator then uses these waypoints to generate textual directions that use natural language to communicate the results. In one particular embodiment, the route generator employs a natural language generator (NLG), which is configured to receive a high-level representation of the route segment, and uses common phrases to generate a textual representation that matches what a person might say. The driving directions description can be annotated with appropriate emphasis markers and other annotations that distinguish significant phrases within the generated directions (e.g., "Turn left after you pass the shopping center"). The human-centric, natural language directions produced can be conveyed to the user via a number of ways, such as: by displaying them as part of a web page; by delivering them as spoken instructions over a cell phone, PDA, or other speech-enabled mobile device; and delivered one step at a time (or other suitable delivery scheme respectful of the user's ability to read/listen to the delivered travel directions in real-time) via speech and/or text and/or graphics to an in-car navigation device or GPS-equipped mobile device. Various communication protocols and transmission techniques can be used in delivering the directions, or access to those directions (e.g., TCP/IP, HTTP, GSM/GPRS, TDMA, CDMA, streaming, SMTP, FTP, NNTP, SNMP, TELNET, HTML, XML, SOAP, etc), depending on the transmission medium or transmission mediums used. Numerous applications will be available in light of this disclosure, and the present invention is not intended to be limited to any one in particular.

While producing spoken output, the markers/annotations attached to or otherwise associated with the natural language route description are used to produce appropriate changes in intonation and emphasis. For instance, assume the user requests directions to the following destination: Nob Hill near 6217 Hopi Court 95123. Using the methodology described herein, the system produces the following step-by-step directions (in accordance with one example embodiment).

Head west from Hopi Ct and Turn right at Hopi Circle.
Take your first right on to Cayuga Drive, and go three blocks.
Turn left on Snell and go three blocks to get to the traffic light at Santa Teresa.
Go through this intersection, and take your first left to enter the mall with the Starbucks coffee shop to arrive at your destination.

As can be seen with these example directions, visual emphasis (italics in this case) is used to indicate key-phrases in the directions (e.g., first right, Starbucks coffee shop, etc); when generating spoken directions from these textual direction, these key-phrases are highlighted by appropriate pitch and intonation changes (e.g., by operation of voice synthesizer 220). In this example, Starbucks could be one of the merchants who has paid to be listed in the waypoints database, and would be charged an appropriate fee on a per-impression basis.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A machine-readable medium encoded with instructions, that when executed by a processor, cause the processor to carry out a process for generating human-centric driving directions, the process comprising:
    generating a route in response to a user request for travel directions, the request specifying at least a target destination;
    identifying distinctive waypoints along the route, wherein the waypoints are physical structures along the route and are in addition to road names and road topology and each waypoint is associated with a distinctiveness score, wherein the distinctiveness score of each waypoint is based at least in part on a visual prominence of the respective waypoint and based at least in part on an advertising fee per use for incorporating the respective waypoint in travel directions; and
    incorporating one or more of the waypoints into travel directions responsive to the associated distinctiveness score.

2. The machine-readable medium of claim 1 wherein identifying distinctive waypoints along the route includes:
    identifying cross-streets that intersect each segment of the route, thereby defining route sub-segments between cross-streets; and
    identifying distinctive waypoints along one or more of the sub-segments.

3. The machine-readable medium of claim 1 wherein identifying distinctive waypoints along the route includes accessing a waypoint database.

4. The machine-readable medium of claim 3 wherein the waypoint database lists businesses and their respective locations, and at least one of those businesses pay an advertising fee to have their location used as a waypoint in travel directions.

5. The machine-readable medium of claim 1 wherein businesses pay an advertising fee to have their location used as a waypoint in travel directions.

6. The machine-readable medium of claim 1 wherein incorporating one or more of the waypoints into travel directions includes selecting waypoints categorically related to the target destination.

7. The machine-readable medium of claim 1 wherein incorporating one or more of the waypoints into travel directions includes generating textual directions that use natural language to communicate the travel directions.

8. The machine-readable medium of claim 7 wherein generating textual directions that use natural language to communicate the travel directions includes:
    receiving a high-level representation of a route segment including waypoints associated with that segment; and
    using human-centric phrases to generate the textual directions.

9. The machine-readable medium of claim 1 further comprising:
    annotating the travel directions to distinguish one or more phrases therein.

10. The machine-readable medium of claim 1 further comprising at least one of:
    sending the travel directions to the user for display; and
    sending the travel directions to the user for aural presentation.

11. The machine-readable medium of claim 1 further comprising at least one of:
    annotating the travel directions to distinguish one or more phrases therein;
    sending the travel directions to the user for aural presentation; and
    high-lighting the one or more distinguished phrases by at least one of pitch and intonation changes.

12. A computer implemented method for generating human-centric driving directions, comprising:
    generating a route in response to a user request for travel directions, the request specifying at least a target destination;
    identifying distinctive waypoints along the route, wherein the waypoints are physical structures along the route and are in addition to road names and road topology and each waypoint is associated with a distinctiveness score, wherein the distinctiveness score of each waypoint is based at least in part on a visual prominence of the respective waypoint and based at least in part on an advertising fee per use for incorporating the respective waypoint in travel directions; and
    incorporating one or more of the waypoints into travel directions responsive to the associated distinctiveness score.

13. The method of claim 12 wherein identifying distinctive waypoints along the route includes:
  identifying cross-streets that intersect each segment of the route, thereby defining route sub-segments between cross-streets; and
  identifying distinctive waypoints along one or more of the sub-segments.

14. The method of claim 12 wherein businesses pay an advertising fee to have their location used as a waypoint in travel directions.

15. The method of claim 12 wherein incorporating one or more of the waypoints into travel directions includes selecting waypoints categorically related to the target destination.

16. The method of claim 12 wherein incorporating one or more of the waypoints into travel directions includes:
  receiving a high-level representation of a route segment including waypoints associated with that segment; and
  using human-centric phrases to generate the textual directions.

17. The method of claim 12 further comprising at least one of:
  sending the travel directions to the user for display; and
  sending the travel directions to the user for aural presentation.

18. The method of claim 12 further comprising at least one of:
  annotating the travel directions to distinguish one or more phrases therein;
  sending the travel directions to the user for aural presentation; and
  high-lighting the one or more distinguished phrases by at least one of pitch and intonation changes.

19. A system for generating human-centric driving directions, comprising:
  means for generating a route in response to a user request for travel directions, the request specifying at least a target destination;
  means for identifying distinctive waypoints along the route, wherein the waypoints are physical structures along the route and are in addition to road names and road topology and each waypoint is associated with a distinctiveness score, wherein the distinctiveness score of each waypoint is based at least in part on a visual prominence of the respective waypoint and based at least in part on an advertising fee per use for incorporating the respective waypoint in travel directions; and
  means for incorporating one or more of the waypoints into travel directions responsive to the associated distinctiveness score.

20. The system of claim 19 wherein the means for identifying distinctive waypoints along the route includes:
  means for identifying cross-streets that intersect each segment of the route, thereby defining route sub-segments between cross-streets; and
  means for identifying distinctive waypoints along one more of the sub-segments.

21. The system of claim 19 wherein businesses pay an advertising fee to have their location used as a waypoint in travel directions.

22. The system of claim 19 wherein the means for incorporating one or more of the waypoints into travel directions includes means for selecting waypoints categorically related to the target destination.

23. The system of claim 19 wherein means for incorporating one or more of the waypoints into travel directions includes:
  means for receiving a high-level representation of a route segment including waypoints associated with that segment; and
  means for using human-centric phrases to generate textual directions.

24. The system of claim 19 further comprising at least one of:
  means for sending the travel directions to the user for display; and
  means for sending the travel directions to the user for aural presentation.

25. The system of claim 19 further comprising at least one of:
  means for annotating the travel directions to distinguish one or more phrases therein;
  means for sending the travel directions to the user for aural presentation; and
  means for high-lighting the one or more distinguished phrases by at least one of pitch and intonation changes.

* * * * *